United States Patent [19]

Mattson

[11] 4,276,684
[45] Jul. 7, 1981

[54] HAND TOOL SPRING COMPRESSOR

[76] Inventor: Charles T. Mattson, 5184 Sonoma Hwy., Santa Rosa, Calif. 95405

[21] Appl. No.: 128,238

[22] Filed: Mar. 7, 1980

[51] Int. Cl.³ .............................................. B23P 19/04
[52] U.S. Cl. ...................................... 29/227; 29/267; 254/10.5; 254/258
[58] Field of Search ......................... 29/227, 225, 267; 254/10.5, 256, 258

[56] References Cited

U.S. PATENT DOCUMENTS

| | | | |
|---|---|---|---|
| 411,079 | 9/1889 | Van Vliet | 29/267 |
| 1,519,982 | 12/1924 | Pasdera | 254/256 |
| 3,418,008 | 12/1968 | Durbin | 254/258 |
| 3,817,549 | 6/1974 | Bohannon et al. | 29/227 |

*Primary Examiner*—James L. Jones, Jr.
*Attorney, Agent, or Firm*—Melvin R. Stidham

[57] ABSTRACT

A hand tool particularly adapted for compressing an automobile shock absorber spring to facilitate repairs. The tool comprises a handle with a hook pivoted at the end thereof adapted to engage under a spring coil. An arm is pivoted near one end thereof intermediate the ends of the handle, and a downwardly facing hook on the end of the arm is adapted to engage over a higher coil of the spring. By pushing the handle with the hooks engaged, the hooks or jaws are brought closer together and a short extension of the arm swings across the handle, camming back a lock sleeve slidable thereon. When the arm extension and handle are in alignment, the lock sleeve is extended by a small spring to enclose the arm extension and prevent movement thereof. The compressed coil spring exerts a force on the jaws trying to separate them. This forces the arm extension tightly against the inner surface of the lock sleeve, holding the sleeve firmly in place against inadvertent retraction.

5 Claims, 3 Drawing Figures

HAND TOOL SPRING COMPRESSOR

BACKGROUND OF THE INVENTION

In repairing many automobile suspension devices, such as the increasingly popular McPherson strut, it is often necessary to remove the coil spring in order to get access to the shock absorber unit. This ordinarily requires that the entire assembly be removed from the car, and after repairs are completed, the spring must again be placed and compressed before the assembly is again installed in the vehicle. Some devices have been made available for compressing such springs but they usually require the operation of a wrench to move a hooked nut along a threaded shaft. This, too, may be time consuming.

OBJECTS OF THE INVENTION

It is an object of this invention to provide a hand tool that will enable quick compression of a spring.

It is a further object of this invention to provide a tool that can compress a spring quickly and hold it compressed.

It is a further object of this invention to provide a tool that can compress and hold a spring with automatic means for locking it against inadvertent release.

It is a further object of this invention to provide a tool that will enable compression of the spring on a shock absorber to enable repairs to the shock absorber without removal from the vehicle.

Other objects and advantages of this invention will become apparent from the description to follow, particularly when read in conjunction with the accompanying drawing.

SUMMARY OF THE INVENTION

In carrying out this invention, I provide a tool having opposing hook-like jaws which grasp coils near the opposite ends of the spring. One hook is pivotally mounted on the end of a handle and the other is on an arm which is pivoted near one end thereof to a point intermediate the ends of the handle. With the hooks engaged on spaced coils, the handle is swung down to bring them closer together and a short extension of the pivoted arm engages a lock sleeve, which is slidable on the handle. This cams it back to retract it, allowing the arm extension to swing past. When the arm extension is aligned with the handle, a spring biases the lock sleeve back to embrace the extension, locking it against movement in either direction. The force of the compressed coil spring tries to separate the jaws, forcing the arm extension firmly against the inner surface of the locking sleeve and holding the sleeve against inadvertent retraction.

DESCRIPTION OF A PREFERRED EMBODIMENT

Figure 1:
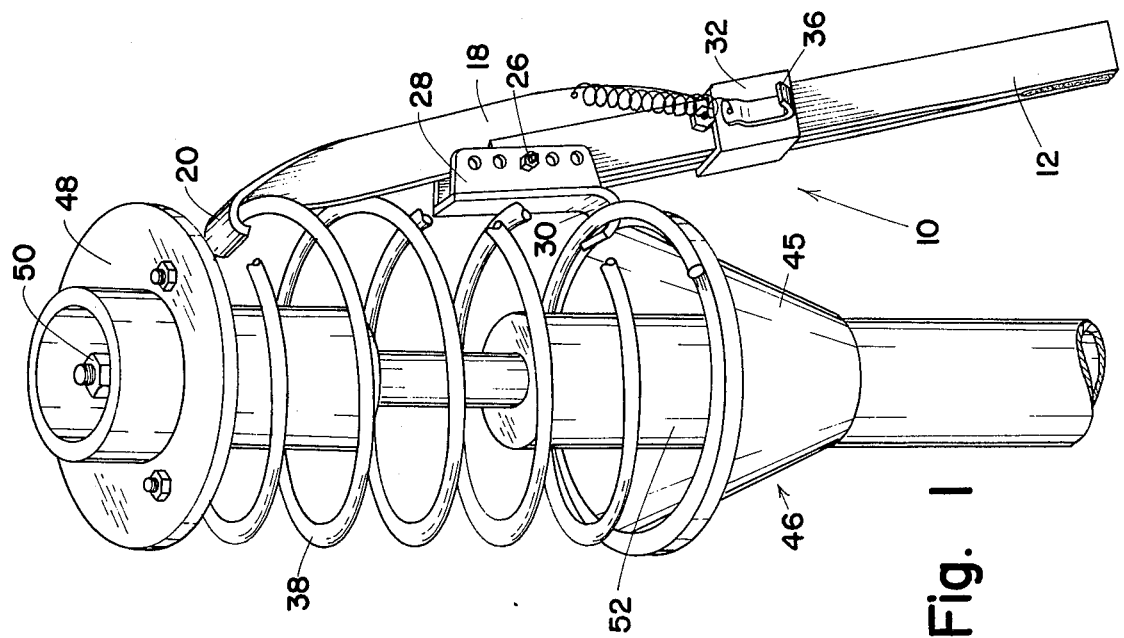
FIG. 1 is a view in perspective of the spring compression tool of this invention as applied to shock absorber coil spring.

Referring now to the drawing with greater particularity, the coil spring compression hand tool 10 of this invention includes a handle 12, which may be of bar stock or the like, comprising two strips of steel 12a and 12b welded together at 14 at one end and separated at the other end 16 to accommodate between them, intermediate their lengths an arm 18. The arm 18 is also made of steel plate, and is twisted at one end to form a downwardly directed hook or upper jaw 20. The arm 12 is pivoted to the handle, as by means of a bolt 21 secured by a nut 22 and has a short cam-lock extension extending beyond the pivot pin 21.

Pivoted at 26 on the end of the handle 12 is a lower jaw carrier 28 having an upwardly disposed hook 30 opposing the top hook 20. The spacing between the jaws 20 and 30 may be adjusted by changing the placement of the pivot pin 26 to selected pairs of holes 29 in the hook carrier 28.

Slidably carried on the handle 12 is a lock sleeve 32 which is biased by means of a light spring 34 against the nut 25 which, therefore, also functions as a lock slide stop. A small handle 36 facilitates manual retraction of the lock sleeve 32.

Figure 2:
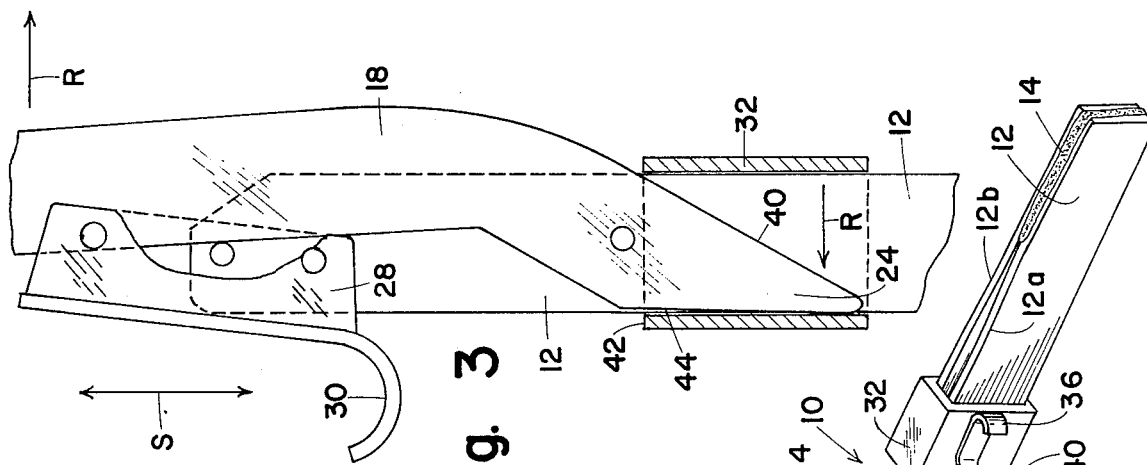
FIG. 2 is a similar view in perspective showing the tool prior to compression of the springs.
Figure 3:
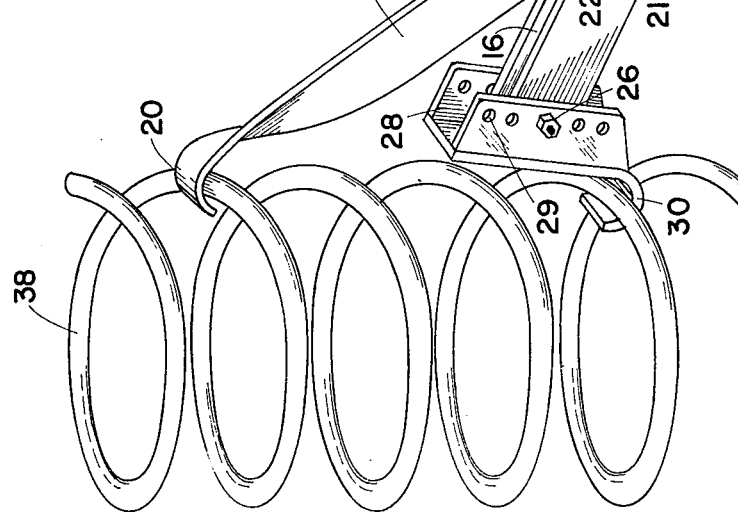
FIG. 3 is an enlarged section view illustrating the operation of the locking sleeve.

In operation, the hooks 20 and 30 are engaged over spaced coils of a coil spring 38 in the position shown in FIG. 2. Then by forcing the handle 12 down, the hooks 20 and 30 are brought together to compress the spring. During this movement, the back surface 40 of the lower arm extension 24, engages against the upper surface 42 of the lock sleeve to cam it downward to a retracted position allowing the lower arm extension 24 to swing past. Then, when the extension is aligned with the handle 12 the light spring 34 pulls the lock sleeve 32 back up to engage the stop 25, in which position, it completely encloses the lower arm extension 22, preventing it from returning to its open position. With the arm 18 so locked, and the coil spring 38 compressed, the force of the coil spring trying to separate the jaws 20 and 30, as indicated by the double arrow S (FIG. 3) tends to rotate the arm 18 and extension 24 as indicated by the arrows R, and press the surface 44 of the lower arm extension 22 firmly against the inner surface of the lock sleeve 32. With the force so exerted, the lock sleeve 32 is gripped firmly, making it virtually impossible to retract manually. Hence, inadvertent retraction, which would release the arm 18 and compressed spring 38 is highly unlikely.

As shown in FIG. 1 when a mechanic seeks to work on a shock absorber 45 of a McPherson suspension unit 46, he may operate the tool 10 as just described to compress the spring 38 away from the top plate 48. In practice, it may be necessary to compress diametrically opposite sides of the spring 38, in which case a second tool 10 may be employed or some appropriate means, such as a hook, used to hold the side first compressed. In any event, with the spring 38 compressed, the top plate 48 may readily be removed by removal of the nut 50. The compressed spring 38 may then be removed and the interior 52 of the shock absorber 46 rendered accessible for whatever repairs may be necessary, without removing the shock absorber 46 from the automobile. When repairs are completed, the compressed spring and top plate 48 may be replaced.

While this invention has been described in conjunction with a preferred embodiment thereof, it is obvious that modifications and changes therein may be made by those skilled in the art to which it relates, without departing from the spirit and scope of this invention, as defined by the claims appended hereto.

What is claimed as invention is:

1. A hand-operated coil spring compressor comprising:
 a relatively straight handle;
 a first hook at the end of said handle adapted to engage a coil of a spring;
 an arm pivoted near one end to said handle intermediate the ends thereof;
 a second hook at the other end of said arm adapted to engage another coil of said spring;
 a sleeve slidable on said handle and movable to engage over said arm when same is aligned with said handle;
 light spring means biasing said sleeve toward said end of the handle; and
 a surface on said arm at said one end adapted to engage and retract said sleeve back in opposition to said spring means to enable passage of said one end into alignment with said handle.

2. The spring compressor tool defined by claim 1 including:
 a stop on said handle to limit movement of said sleeve to engage said one end of the arm fully.

3. The hand-operated tool defined by claim 1 including:
 a jaw carrier pivoted on the end of said handle;
 said first hook being formed on said jaw carrier.

4. The hand-operated tool defined by claim 1 including:
 a jaw carrier of channel configuration straddling said handle;
 said first hook being formed on said jaw carrier;
 a plurality of pairs of aligned holes along the length of said jaw carrier;
 an opening in the end of said handle; and
 a pivot pin receivable in said opening and a selected one of said pairs of aligned holes.

5. The hand-operated tool defined by claim 1 including:
 a small handle on said sleeve for manual retraction thereof.

* * * * *